United States Patent Office 2,824,137
Patented Feb. 18, 1958

2,824,137

METHODS OF PREPARING SECONDARY AROMATIC AMINES

Roger E. Morris, Cuyahoga Falls, Ohio, assignor to The B. F. Goodrich Company, New York, N. Y., a corporation of New York No Drawing. Application October 24, 1955
Serial No. 542,525

7 Claims. (Cl. 260—576)

This invention relates to methods of preparing secondary aromatic amines by reacting phenols with primary aromatic amines in the presence of inorganic and organic titanium compounds, and more particularly this invention pertains to novel methods for preparing secondary aromatic amines by reacting phenols with primary aromatic amines in the presence of inorganic and organic titanium esters or salts and hydrated titanium oxides. The catalysts have the generic formula $Ti(X)_n$ wherein X is an anion, an alkoxyl radical or an acyl radical or a mixture thereof and $n$ is a number of from 2 to 4 and the sum of the valences of the X groups is equal to the valence of the titanium atom.

It is well known in the art that reactions of phenols with primary aromatic amines, such as the reaction of phenol with aniline to form diphenyl amine, are effectively carried out only by bringing the individual reactants into contact with each other at elevated temperatures and in the presence of a catalyst. Heretofore, reactions of phenols with aromatic amines have been catalyzed by strong mineral acids or esters thereof, such as sulfuric acid, hydrochloric acid, phosphoric acid or esters thereof. However, such catalysts have in addition to catalytic properties, other properties that are deleterious to, but heretofore tolerated in, the commercial exploitation of such reactions. For example, the employment of strong mineral acid catalysts requires the use of corrosion resistant reactors. Another deleterious property of the strong mineral acid catalysts is the property of not only catalyzing the reaction of phenols with aromatic amines but concurrently catalyzing a side reaction among the aromatic amines themselves.

It is an object of this invention to provide a catalytic method for reacting phenols with aromatic amines in which reaction inorganic and organic titanium compounds that are substantially neutral are used as the catalysts. Another object of this invention is to provide a catalytic method of reacting phenols with aromatic amines without concurrently catalyzing side reactions among aromatic amines themselves. Other objects will be apparent from the following description which discloses a preferred embodiment of the invention.

I have discovered that the above objects can be attained by carrying out the reaction of phenols with primary aromatic amines in the presence of inorganic and organic titanium esters, salts of titanium, and hydrated titanium oxides.

Hydrated titanium oxide (also known as titanium dioxide gel), an active catalyst or promoter in accordance with this invention, can be represented by the empirical formula $Ti(OH)_4$, but usually is classified in the art according to methods for its preparation. Hydrated titanium oxide, suitable as a catalyst or promoter can be prepared, for example, by basic or aqueous hydrolysis of (a) titanium salts of inorganic acids, such as titanium tetrachloride, (b) titanium salts of organic acids, such as titanium tetraacetate, (c) titanium esters such as tetrabutoxy titanate, (d) titanium polyesters and the like.

One method for the preparation of hydrated titanium oxide is that wherein titanium tetrachloride, when added to water, instantly hydrolyzes and forms a white gelatinous precipitate. The precipitate can be separated from the aqueous media by filtration, and employed in its gel form as a catalyst.

Another method of preparing hydrated titanium oxide consists of adding titanium sulfate salt cake (a mixture comprising about 50% $TiO_2$, 25% $H_2O$ and 25% $H_2SO_4$ calculated on a molar basis) to an aqueous alkaline medium, such as a sodium hydroxide solution containing sufficient base to combine with the sulfate ion in the salt cake. A white gelatinous precipitate of hydrated titanium dioxide results, which can be isolated by filtration in the usual manner.

In general, methods that comprise basic hydrolysis of titanium esters, polyesters, as well as titanium salts, or any other hydrolyzable inorganic or organic titanium compound are suited to the preparation of catalytically active hydrated titanium oxides.

Hydrated titanium dioxide gels, prepared in accordance with the methods set out hereinbefore, preferably contain about 5 to 20% $TiO_2$ by weight or, in other words, the gels usually comprise on a weight basis 5 to 20% $TiO_2$ and 95 to 80% $H_2O$. The water content of hydrated titanium dioxide gels can be reduced to amounts equivalent to 5 to 10% by weight of the gels, but such gels exhibit less catalytic activity than the preferred class.

Esters of titanic acid, which are active catalysts can be represented by the following empirical formula $Ti(X)_n$, wherein X represents an organic radical, such as alkoxy, cycloalkoxy aryloxy, aralkoxy alkaryloxy, alkoxyalkyl, and alkoxyaryl radicals and $n$ represents the integer 4. Preferred esters of this class are saturated hydrocarbon esters of titanic acid, such as tetramethoxy titanate, tetraethoxy titanate, tetraisopropoxy titanate, tetrabutoxy titanate, tetraphenoxy titanate and the like. Mixed esters of titanic acid, such as dimethoxydibutoxy titanate, monoisopropoxytriphenoxy titanate, monobenzyloxytriheptoxy titanate and the like are also active catalysts.

Partial esters of titanic acid that are active catalysts can be represented by the following generic formula $Ti(X)_n$, wherein X represents an anion and an organic radical connected to the titanium ion by an oxygen linkage. Representative of anions are Cl, $SO_3H$, $NO_2$ and the like. Representative organic radicals are alkyl, cycloalkyl, aryl, aralkyl, alkaryl, alkoxyalkyl, and alkoxyaryl radicals. Preferred partial esters of this class are saturated hydrocarbon partial esters of titanic acid, such as trichloromonomethoxy titanate, tribromomonomethoxy titanate, trichloromonoethoxy titanate, trichloromonoisopropoxy titanate, trichloromonobutoxy titanate, dichlorodimethoxy titanate, dibromodiethoxy titanate, difluorodiisopropoxy titanate, diiododibutoxy titanate, dichlorodiheptoxy titanate, monochlorotrimethoxy titanate, monochlorotriethoxy titanate, monobromotriisopropoxy titanate, monoiodotributoxy titanate and the like. Other examples of partial esters of titanic acids are compounds, such as monochlorotri-(2-chloroethoxy) titanate, monochlorotri-(2-ethoxyethoxy) titanate, dichlorodiphenoxy titanate, trichloromonophenoxy titanate, trichloromonobenzyloxy titanate and the like.

Titanium salts of inorganic acids, which are active catalysts can be represented by the generic formula $Ti(X)_n$, wherein X represents an anion, and $n$ represents a whole number of from 2 to 4. Representative of titanium salts of inorganic acids conveniently defined as such because of the amphoteric nature of titanium, are such compounds as titanium di-, tri- and tetrachloride, titanium di-, tri- and tetrabromide, titanium di-, tri- and tetraiodide, titanium di-, tri- and tetrafluoride, titanium disulfate, and the like.

Titanium salts of organic acids that are active catalysts can be represented by the following empirical formula $Ti(X)_n$, wherein X represents an acyl radical and $n$ is 4. The preferred salts within this class are those in which the acyl group has a saturated hydrocarbon residue. Representative of titanium salts of organic acids are, such compounds as titanium tetraacetate, titanium tetrapropionate, titanium tetrabutyrate, titanium tetrastearate, titanium tetrabenzoate, titanium tetrachloroacetate and the like.

Other titanium acylates which act as catalysts are polymeric compounds of titanium having both hydroxyl groups and an acyl group on each titanium atom or alkoxy groups and an acyl group on each titanium atom. Included among such compounds are hydroxy titanium stearate, hydroxy titanium oleate, hydroxy titanium soya oil acid acylate, hydroxy titanium linseed oil acid acylate, hydroxy titanium castor oil acid acylate, hydroxy titanium tall oil acid acylate, hydroxy titanium cocoanut oil acid acylate, methoxy, ethoxy, propoxy, isopropoxy, butoxy and isobutoxy stearates, oleates, soya oil acid acylates, linseed oil acid acylates, castor oil acid acylates, tall oil acid acylates and cocoanut oil acid acylates.

Mixed titanium salts of inorganic and organic acids are also active catalysts. Representative and preferred salts within this class are such compounds as titanium trichloromonoacetate, titanium dibromodibutyrate, titanium monofluorotripropionate and the like.

Of the aforementioned classes of titanium catalysts, the most preferred classes are hydrated titanium oxides, esters of titanic acid wherein all of the titanium valences are satisfied by alcoholate radicals, and titanium salts of organic acids wherein all of the titanium valences are satisfied by organic acid radicals; more accurately, the order of titanium catalyst preference decreases in direct proportion to the increase in the number of inorganic anion substituents linked directly to the titanium atom.

In general, methods for preparing secondary amines by the titanium catalyzed reactions from phenols and primary aromatic amines comprises liquid phase contact of a phenol with a primary aromatic amine in the presence of at least one of the titanium catalysts described hereinbefore.

Reaction temperatures and/or pressures can be varied widely, but preferably should be such that during the course of the reaction the reactants are essentially maintained in liquid phase, such as that obtained at liquid reflux reaction conditions.

The proportions of reactants can be varied somewhat, although it is preferred to employ an excess of the primary amine. Thus, the molar ratio of reacting phenol groups to amino groups can be 1 to 1 or as high as about 1 to 2.5. There is little or no advantage in increasing the molar ratio of amino groups above 2.5, based on the phenol groups in the reaction mixture. It is believed evident that if polyhydric phenols are reacted with monohydric amines or polyhydric amines, the ratio of reactants can be adjusted to provide at least one aromatic amino group for each phenol group. Usually if a polyhydric phenol is reacted with a monohydric amine a mixture of compounds having the structure OH—R—NHR and R—NH—R—NHR, where R represents an aromatic nucleus will be produced. A mixture of polyhydric amine and monohydric phenol will yield a mixture of compounds having the generic structure $H_2N$—R—NHR and RNH—R—NHR, where R is an aromatic nucleus. Mixtures of polyhydric phenols and polyhydric amines will produce some secondary amines having free phenol groups and some secondary amines with free primary amino groups on aromatic rings. Thus, if hydroquinone is reacted with paraphenylene diamine the following compounds will be present in the reaction mixture. $H_2NRHN$—R—$NHRNH_2$, HOR—$NHRNH_2$ and

HO—R—NHRNH—ROH

In each of these empirical formulas, R represents an aromatic nucleus.

Catalyst concentrations can be varied widely from about 0.5% to 5.0% or 10.0% or even higher, although it is preferred that catalyst be employed in a concentration of from about 1.0% to about 5.0% by weight of the total weight of the reactants. Since catalyst activity level is apparently dependent on catalyst concentration, it is even more preferred that catalyst concentrations of from about 2.0% to about 5.0% by weight of the reactants be employed.

The phenols which can be reacted with a primary aromatic amine include the monohydric mono and polynuclear phenols, such as phenol, chlorophenol, pyrocatechol, ortho-, meta-, and para-xylenols, hydroquinone, orthocresol, metacresol, paracresol, alpha and beta-naphthols, indanols having at least one —OH group on the aromatic portion of the molecule, resorcinol, phloroglucinol, 4,4-dihydroxybiphenyl, mesitol, thymol, carvacrol, guaiacol, o-eugenol, orcinol, pyrogallol, hydroxyanthracene, 2-hydroxyanthracene and the like. As illustrated by the aforementioned compounds, the phenols can be any mono or polyhydric or mono or polynuclear phenol.

Aromatic amines that will react with aromatic phenols in accordance with this invention include mono and polyaromatic primary amines and substituted derivatives thereof, such as aniline, the toluidines, the xylidenes, alpha-naphthyl amine, beta-naphthyl amine, p-phenylene diamine, p-tolylene diamine, p-amino diphenyl amine, benzidine, tolylene diamines, xylylene diamines and the like.

The following examples are intended to illustrate methods of procuring secondary aryl amines by reacting phenols with primary aromatic amines in the presence of titanium catalysts. It is not intended that this invention be limited solely thereto, for numerous variations in the practice of this invention will be apparent to those skilled in the art.

*Example I*

A mixture consisting of 100 parts hydroquinone, 100 parts aniline and 6 ml. (equivalent to 6 parts by weight) tetraisopropoxy titanate was charged in a glass reaction flask equipped with a reflux column and condensor and means for venting or removing water. The mixture was heated at 184–228° C. for 2¼ hours under partial reflux with removal of water as formed. Thereafter, an additional 130 parts of aniline was added to the reaction flask over an interval of 2 hours while still maintaining reflux temperatures. The mixture was then continuously heated for an additional 18 to 20 hours until the temperature reached 240° C. The reaction mixture was transferred to a distillation flask and distilled in vacuo. 43.8 parts of aniline, 67.9 parts (36% yield) of p-hydroxydiphenylamine, 139.4 parts (53.5% yield) of N,N'-diphenyl-p-phenylenediamine and 22 parts residue, were found in the reaction mixture.

*Example II*

110 parts of hydroquinone, 100 parts of aniline and 83 parts titanium dioxide gel containing about 92% water by weight prepared by adding 6.5 ml. of liquid titanium tetrachloride to water at room temperature, removing the white gelatinous hydrated titanium dioxide formed from solution by filtration, and washing the hydrated titanium dioxide 4 times with water, were charged to a glass reaction flask equipped as described in Example I. The mixture was heated at 200 to 240° C. during a 4 hour interval with water being removed continuously. Heating was continued at 225–233° C. for an additional 6 hours while an additional 100 parts of aniline was added to the reaction flask dropwise. Thereafter, heating was continued for 20 hours until the reaction temperature rose to 250° C. The product was isolated as in Example I and consisted of 34.3 parts of unreacted aniline, 119.2 parts (64.5%) p-hydroxydiphenylamine, 75 parts (28.7%) N,N'-diphenyl-p-phenylenediamine, and 30.2 parts residue.

*Example III*

A mixture consisting of 110 parts hydroquinone, 110 parts aniline and 2.0 parts of titanium sulfate salt cake containing about 50% $TiO_2$, 25% $H_2SO_4$ and 25% $H_2O$ by weight, was heated under partial reflux at a temperature of about 185–250° C. for 4½ hours. An additional 116 parts of aniline were added dropwise and the heating continued at 195–205° C. for an additional 12 hours. The reaction mixture was washed twice with hot water and filtered with suction each time. The reacted mixture was distilled in vacuo to give 114 parts (61.5% yield) of p-hydroxydiphenylamine.

*Example IV*

A mixture consisting of 1.0 mole beta-naphthol, 1.2 mole aniline, and 5.0 ml. (0.0018 mole) tetraisopropoxy titanate was heated at a temperature of 180–235° C. for a period of 14.5 hours in a 1400 ml. autoclave equipped as in Example I. The reaction mixture was cooled to 25° C. whereby the desired reaction product, phenyl-beta-naphthylamine, crystallized and was recovered by subsequent filtration, and recrystallization from ethanol in a yield of 75.3%.

*Example V*

188 parts phenol, 232 parts aniline, and 21 parts of tetraisopropoxy titanate were charged in a 1400 ml. autoclave, heated at reflux temperatures of 350–385° C. and 200 to 300 p. s. i., with frequent venting of water, for 12 hours. The reaction was continued thereafter for an additional 32 hours at 340–350° C. without venting. The reaction mixture was cooled, filtered to remove the solid catalyst, and distilled. One hundred and four parts of diphenylamine was recovered, the equivalent of a conversion of 30.8% of phenol.

It was noted, during venting of the autoclave or the glass reaction flask in all of the foregoing examples that there was a complete absence of $NH_3$ fumes, which indicated that the titanium catalysts did not activate a condensation reaction between primary aromatic amines.

From the foregoing description of this invention it should be readily apparent that by the use of titanium catalysts it is possible to condense phenols with primary aromatic amines to form secondary aromatic amines. The titanium catalysts are non-corrosive and the desired reactions are carried out without the concurrent reaction of aromatic amines among themselves. That the catalysts of this invention are of commercial utility is exemplified by the preparation of phenyl-beta-naphthylamine, a well recognized and widely employed rubber antioxidant.

Although specific embodiments and examples of this invention have been set-out heretofore, it is not intended that this invention shall be limited thereto, but that this invention shall be construed only in accordance with the spirit and scope of the appended claims.

I claim:

1. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase, at an elevated temperature and in the presence of a catalyst having the generic formula $Ti(X)_n$ in which X represents a member selected from the class consisting of an —OH radical of hydrated titanium oxide, a halide radical, a sulfate radical, a lower alkoxy radical and an acyl radical of aliphatic fatty acids having from 1 to 18 carbon atoms and mixtures thereof, $n$ is a number from 2 to 4 and the sum of the valences of the X groups is equal to the valence of titanium.

2. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase, at an elevated temperature in the presence of a lower alkoxy titanate.

3. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase, at an elevated temperature in the presence of hydrated titanium dioxide as a catalyst.

4. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase at an elevated temperature in the presence of a titanium halide as a catalyst.

5. The method of claim 4 in which the titanium halide is titanium tetrachloride.

6. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase, at an elevated temperature in the presence of tetraisopropoxy titanate as a catalyst.

7. A method of preparing secondary aromatic amines comprising reacting a primary aromatic amine selected from the class consisting of mono- and diamino, mono- and bicyclic primary amines with a phenol selected from the class consisting of mono- and polyhydric mono- and bicyclic phenols in liquid phase, at an elevated temperature in the presence of titanium sulfate cake as a catalyst.

References Cited in the file of this patent

UNITED STATES PATENTS

| | | |
|---|---|---|
| 1,914,557 | Craver | June 20, 1933 |
| 1,921,587 | Semon et al. | Aug. 8, 1933 |
| 2,098,039 | Hill et al. | Nov. 2, 1937 |

FOREIGN PATENTS

| | | |
|---|---|---|
| 611,316 | Great Britain | Oct. 20, 1948 |

OTHER REFERENCES

Groggins: "Unit Processes in Org. Synthesis," p. 371 (4th ed.), 1952.